Dec. 2, 1958  L. M. STRUNK  2,862,569
BELT GUIDE MEANS FOR TRACTOR BELT-TIGHTENING ARRANGEMENT
Filed Oct. 4, 1954  3 Sheets-Sheet 1

INVENTOR.
LEONARD M. STRUNK
BY
ATTORNEY.

INVENTOR.
LEONARD M. STRUNK
BY
ATTORNEY.

Dec. 2, 1958 L. M. STRUNK 2,862,569
BELT GUIDE MEANS FOR TRACTOR BELT-TIGHTENING ARRANGEMENT
Filed Oct. 4, 1954 3 Sheets-Sheet 3

INVENTOR.
LEONARD M. STRUNK
BY
ATTORNEY.

United States Patent Office 2,862,569
Patented Dec. 2, 1958

2,862,569

BELT GUIDE MEANS FOR TRACTOR BELT-TIGHTENING ARRANGEMENT

Leonard M. Strunk, Coatesville, Pa.

Application October 4, 1954, Serial No. 460,046

2 Claims. (Cl. 180—70)

This invention relates generally to draft vehicles and is concerned more particularly with an improved garden type tractor.

A principal object of the present invention is to provide an exceedingly simple and effective belt-tightening arrangement for transmitting power from the power unit to the traction wheels as desired and which operates automatically when the tractor engine is at rest to secure the tractor against movement either forwardly or backwardly.

Another object of the present invention is to provide a belt tightening arrangement of the character aforesaid which includes a belt drive between the engine main drive shaft and the tractor drive wheels and means for rendering the belt drive effective as desired for forward movement of the tractor under the power of the engine, the belt-tightening arrangement including also means for permitting free idling of the tractor engine while the tractor is at rest, in which case the engine may continue to run while the drive belt remains motionless.

Still another object of the present invention is to provide an exceedingly compact arrangement wherein the power unit may be straddled by an operator seated at his station, and wherein the means for transmitting power is controlled by a device operable by one foot of the operator.

And still another object of the present invention is to provide for such a tractor a frame structure which is exceedingly simple in design and construction and simple and inexpensive to manufacture while at the same time structurally adequate for its intended purpose.

Other objects and advantages of the present invention will appear more fully hereinafter, it being understood that said invention consists substantially in the combination, construction, location and general arrangement of parts, all as described in detail in the following specification, as shown in the accompanying drawing and as fully pointed out in the appended claims.

Figure 1:
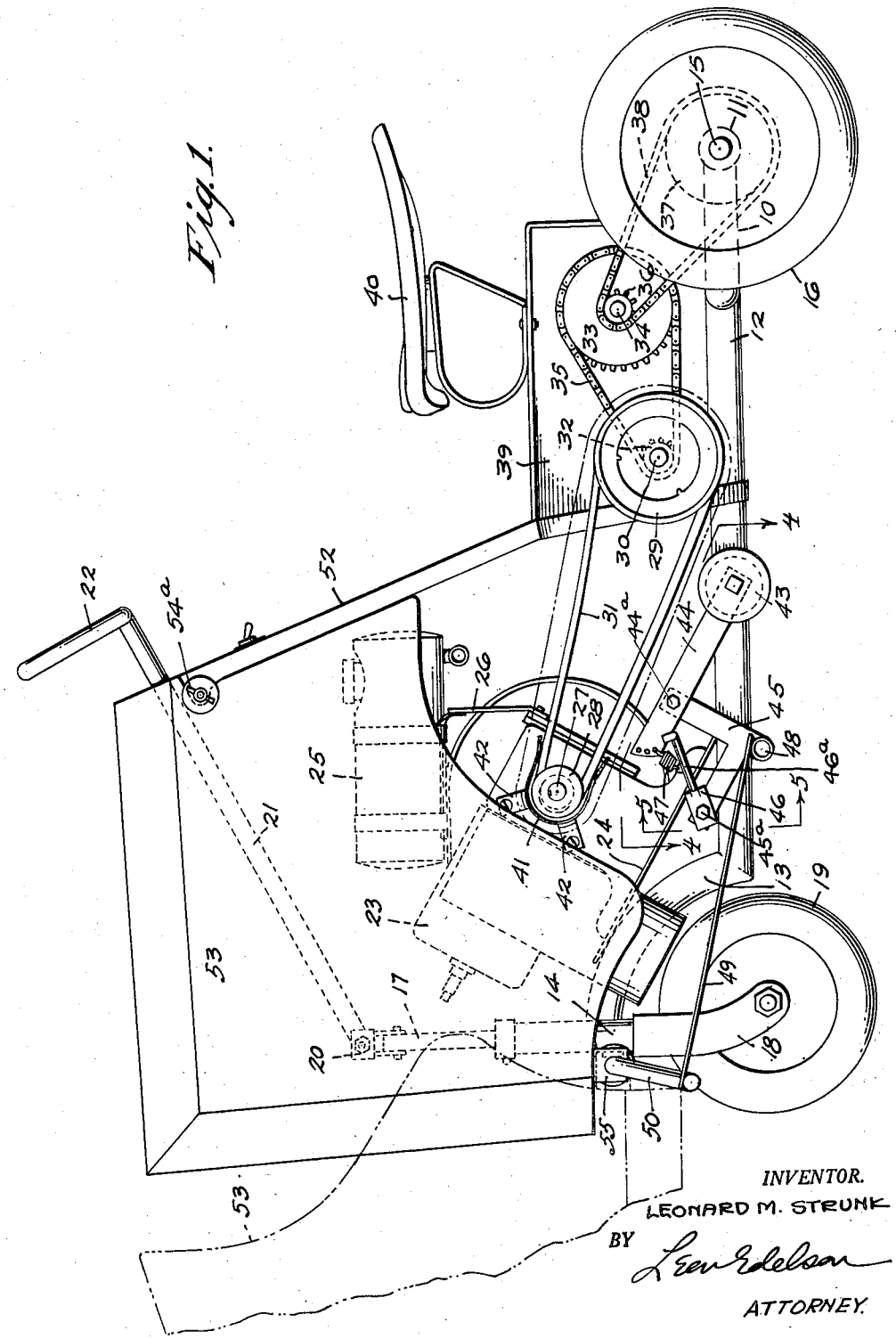
Figure 1 is a side elevation of a tractor embodying the present invention, the rear traction wheels being shown operatively interlocked with the power unit so as to secure the tractor against movement forwardly, as when parked and facing down grade.
Figure 2:
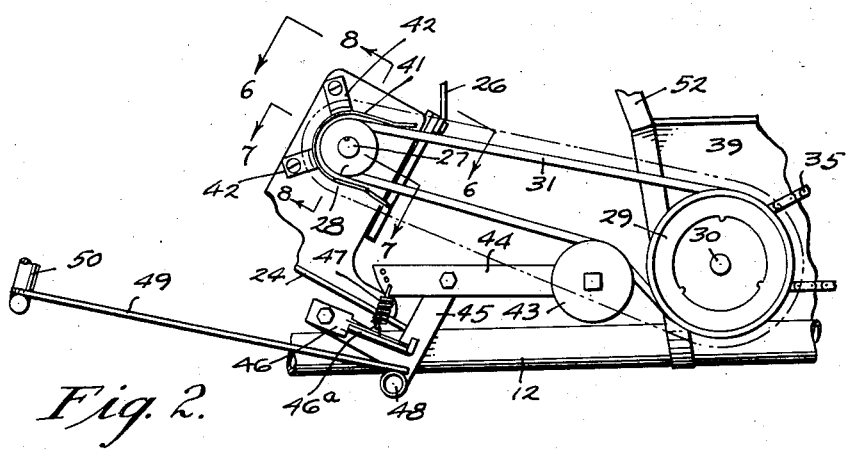
Figure 2 is a fragmentary side elevation showing the main drive belt tightened for transmitting power from the power unit to the rear traction wheels.
Figure 8:
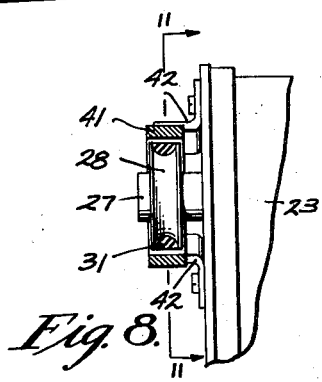
Figure 6:
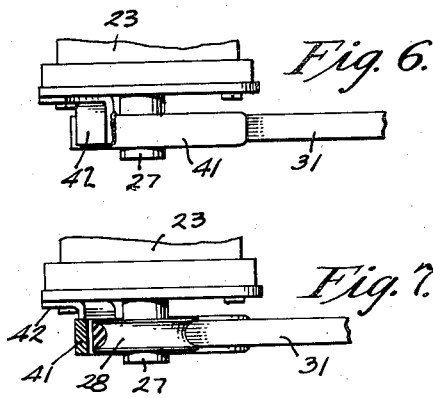
Figure 7:
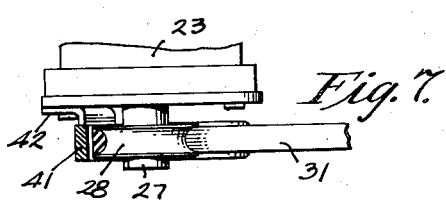
Figure 9:
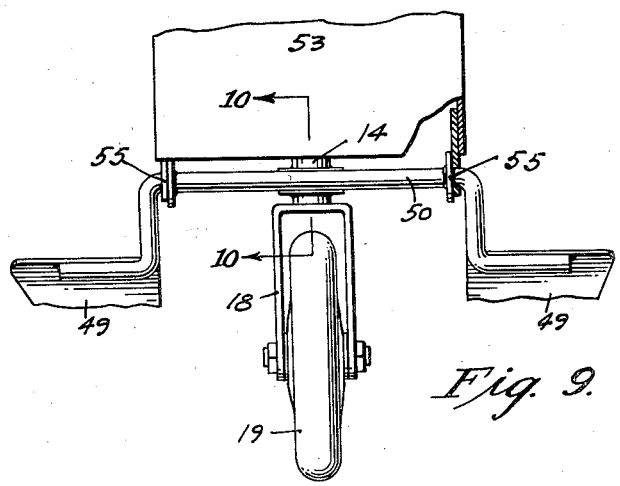
Figure 10:
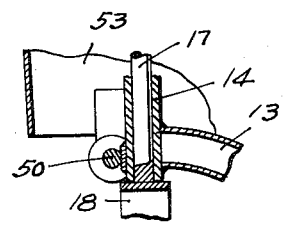

Figures 6 and 7 are enlarged views respectively on lines 6—6 and 7—7 of Figure 2;

Figure 8 is an enlarged section on line 8—8 of Figure 2;

Figure 9 is a fragmentary front elevation of the tractor shown in Figure 1;

Figure 10 is a section on line 10—10 of Figure 9; and

Figure 11:
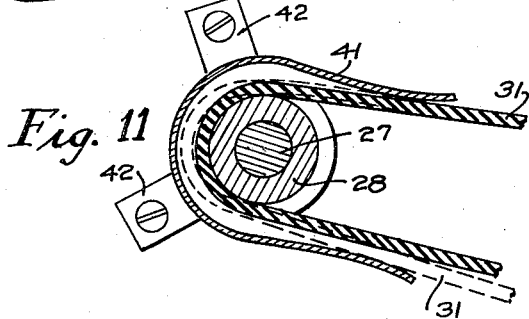

Figure 11 is an enlarged section taken on the line 11—11 of Figure 8.

Referring to the drawings, the tractor of the present invention is provided with a rigid frame structure preferably made of tubular stock. The tractor frame is provided with a transversely extending forwardly arched part 10 the opposite end portions of which respectively mount a pair of axially alined journals 11—11. Projecting forwardly from the part 10 is a longitudinally extending part 12 terminating in a portion 13 which arches forwardly and upwardly and mounts a journal 14.

For supporting the rear of the tractor frame, an axle 15 is projected through the journals 11—11, and a pair of widely spaced traction wheels 16—16 are conventionally mounted on the opposite end portions of the same. For supporting the front of the tractor frame, a steering shaft section 17 is projected through the journal 14, which is seated upon a forked depending extension 18 of the steering shaft section 17 which conventionally mounts a dirigible wheel 19. For steering the tractor, the upper end of the steering shaft section 17 is connected by a universal type joint 20 to a steering shaft section 21 which mounts a steering wheel 22 and which is supported in a manner to be described.

The tractor is provided with a front mounted power unit 23, preferably an internal combustion engine. For mounting the latter, the opposite end portions of an attaching plate 24 are respectively seated upon the frame part 12 and its forwardly arched portion 13, being secured to the same, as by welding, in the inclined position shown. A gas tank 25 is located over the power unit 23, being mounted on a bracket 26 suitably secured to the power unit 23. The latter is provided with a power take-off shaft 27 which is operatively connected to the rear traction wheels 16—16 by the power transmitting means now to be described.

As most clearly appears in Figure 1, this power transmitting means includes main, intermediate and final belt drives. The main belt drive comprises a driving pulley 28 mounted on the power take-off shaft 27, a driven pulley 29 mounted on a stub shaft 30 and a belt 31 trained over the pulleys 28 and 29. The intermediate belt drive comprises a chain sprocket 32 mounted on the stub shaft 30, a chain sprocket 33 mounted on a stub shaft 34 and a sprocket chain 35 trained over the chain sprockets 32 and 33. The final belt drive comprises a chain sprocket 36 mounted on the stub shaft 34, a chain sprocket 37 mounted on the rear axle 15 and a sprocket chain 38 trained over the chain sprockets 36 and 37. The stub shafts 30 and 34 are suitably journalled in a rigid support 39, carried by the tractor frame member 12, which support additionally mounts an operator's seat 40.

The belt 31 may be of any conventional shape in transverse cross section, e. g., V-shaped cross-section or half-round, as shown in Figure 7, and is of a length and rigidity sufficient for insuring a loose fit around the pulley 28 when the belt is disposed in close embracing relation to the pulley 29. For maintaining the belt 31 in its proper relation to the pulley 28, a guide 41 is provided therefor in the form of a plate bent to U-shape and disposed in closely spaced embracing relation to the pulley 28 and in non-binding relation to the belt 31, the guide 41 being provided with a pair of relatively fixed portions or arms disposed upon diametrically opposite sides of the pulley 28 and an arm connecting portion extending approximately half way about the pulley 28, and being further provided with a pair of mounting lugs 42—42 which extend laterally of the guide and are each apertured for projection therethrough of the bolts which secure the guide in position as shown.

Figure 3:
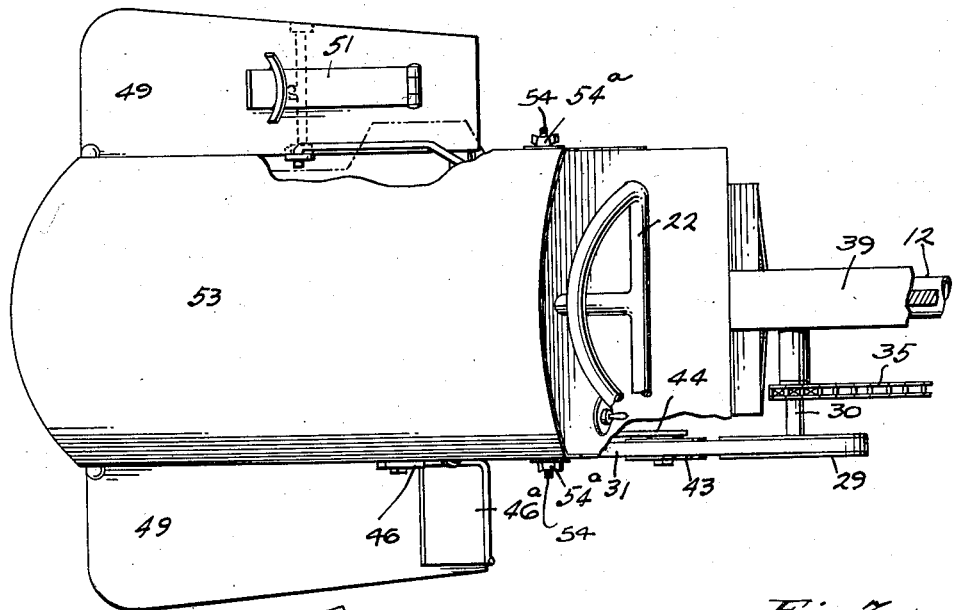
Figure 3 is a fragmentary plan view of the tractor shown in Figure 1.
Figure 4:
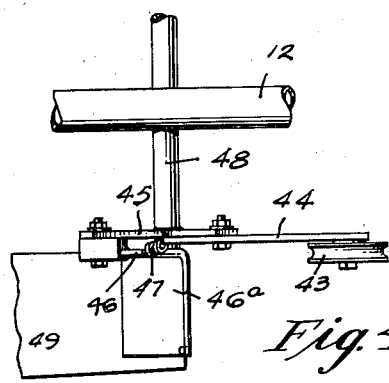
Figure 4 is a view on line 4—4 of Figure 1.
Figure 5:
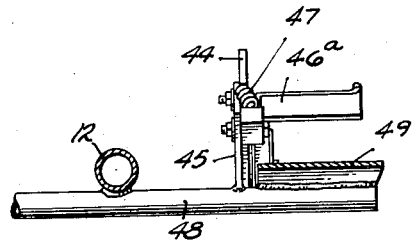
Figure 5 is a vertical section on line 5—5 of Figure 1.

The tractor is provided with a tightener for the belt 31 including a pulley 43 which is freely revolubly mounted on one end of a lever 44 normally disposed in underlying spaced relation to the belt 31. Intermediate its ends, the lever 44 is pivoted, as at 44ª, to one end of a rigid angle bracket 45 for swinging movement about a horizontal axis. On the opposite end of the bracket 45, as at 45ª, there is pivoted a lever 46 which has an intermediate portion connected to the free end of the lever 44 by a coiled tension spring 47. As most clearly appears in Figures 1, 3 and 4, the lever 46 is provided with a laterally extending rest 46ª for the heel of the operator of the tractor. The bracket 45 is carried by a cross bar 48 disposed in underslung relation to the tractor frame part 12 and secured thereto as by welding. Normally, the weight of the pulley 43 is sufficient to maintain the same in depressed position out of engagement with the belt 31, as shown in Figure 1.

Disposed respectively on opposite sides of the tractor are a pair of foot rest plates 49—49 the rear ends of which are seated respectively on the opposite end portions of the cross bar 48, and the front ends of which are seated respectively on the opposite end portions of a pivot bar 50 which extends across the front of the tractor. The intermediate portion of the pivot bar 50 is secured as by welding to the front of the journal 14, and the opposite end portions thereof are downwardly offset for respectively receiving the front ends of the foot rest plates 49—49. The foot rest plate 49 on the left side of the tractor is disposed just below the lever 46 so that when the left heel of the operator engages the heel pedal 46ª the toe of the left foot may conveniently rest on the foot board or plate 49. The foot rest plate 49 on the right hand side of the tractor mounts an accelerator foot pedal 51.

For housing the power unit, a transversely extending shield 52 is interposed between the power unit 23 and the operator's seat 40, being carried by the tractor frame and being secured thereto as by welding. In addition, a hood 53 is provided which extends over the steering shaft section 21 and the power unit 23 downwardly along the opposite sides and front of the power unit 23, the rear thereof being fitted to the shield 52 and being detachably secured thereto as by bolts 54 which project outwardly from the opposite side edges of the shield 52 and are fitted with winged nuts 54ª, the bolts being adapted for respective accommodation in suitable notches provided in the rear edges of the opposite side panels of the hood. The opposite lower front corners of the hood 53 are pivotally secured to the bar 50, as at 55—55. The steering shaft section 21 projects through the shield 52 and is suitably supported thereby.

The freely extending arms of the U-shaped guide 41 respectively overlie those portions of the belt 31 which closely adjoin and extend tangentially of the pulley 28 and are thus operative to limit the extent to which said belt portions may be moved apart. Due to the relative rigidity of the belt 31, it will be apparent that by so restricting the separation of the upper and lower runs of the belt in the immediate region of the pulley 28, the bight of the belt will be spaced somewhat from the pulley 28 so long as the belt is not tensioned by the belt tightener pulley 43. In other words, when the belt 31 is in its slack condition as shown in Figure 1, a very small section of the belt approaching the pulley 28 and a very small section of the belt leaving the pulley 28 are seated in the groove of the pulley 28, but a major section of the part of the belt trained over the pulley 28 is operatively unseated from the groove of the latter, in consequence of which the pulley 28 is free to rotate freely with respect to the belt by reason of insufficient traction therebetween. Thus, when the engine is idling or even when it is running at normal speed, the belt will not be driven by the pulley until it is drawn more or less tightly against the pulley by operation of the belt tightener pulley 43 bearing against the belt under sufficient pressure to take up the slack thereof. Consequently, when the parts are in their relative positions as shown in Figure 1, the belt will be motionless and the tractor will not move though the engine be running.

When, however, the lever 46 is depressed by the heel of the operator, the lever 44 will be swung vertically about its pivot 44ª in consequence of which the pulley 43 will be pressed into engagement with the lower run of the belt 31, the slack of the latter being thus taken up to provide a driving connection between the engine drive pulley 28 and the driven pulley 29, which latter in turn drives the traction wheels of the tractor through the intervening sprocket chain. So long as the operator maintains the lever 46 fully depressed, the pulley 43 is yieldably maintained in the belt tightening position shown in Figure 2, so that upon operation of the power unit, power is transmitted through the main, intermediate and final belt drives to the rear traction wheels 16—16 and the tractor moves forwardly.

It is important to note that the arrangement above described serves automatically to brake the tractor against forward or rearward movement when its engine is at rest, that is, not running, in which event the engine drive pulley is, of course, held against rotation by the compression of the engine. Assuming the tractor to be in its condition shown in Figure 1 with the pulley 43 out of engagement with the belt 31, upon any attempt to push the tractor forwardly the pulley 29 will tend to rotate in the same forward direction as the tractor wheels and will tend to correspondingly move the belt 31. However, since the portion of the belt leaving the pulley 28 is seated in the groove of the pulley, the lower run of the belt frictionally anchors itself to the pulley 28, which latter is secured against rotation by the engine compression, in consequence of which the pulley 29 and the wheels of the tractor can turn only sufficiently to place the lower run of the belt 31 under tension, whereupon the pulley 29 is held against rotation and so locks the traction wheels against movement in a forward direction.

A similar action occurs should an attempt be made to move the tractor rearwardly, in which event the pulley 29 rotates in the opposite direction than that above mentioned only enough to place the upper run of the belt 31 under tension, whereupon the pulley 29 is held against rotation and so locks the traction wheels against movement in a rearward direction.

It will be apparent that the above described automatic braking feature of the tractor is of especial importance when it is being operated on an incline, it being only necessary to shut off the engine and release the heel pedal 46ª to hold the tractor stationary against either forward or backward movement. Should it be found necessary to move the tractor while the engine is shut off, all that is required is to slip the belt off the pulley 29. Of course, when the tractor engine is idling, there is no snubbing or restraining action against forward movement of the belt about the drive pulley and in such case the tractor may be pushed or may coast in a forward direction at a speed which is governed by the slip of the belt relatively to the rotating drive pulley 28. However, free backward movement of the tractor when the engine is idling would be resisted due to the fact that in such case the direction of rotation of the drive pulley 28 is opposed to that in which the pulley 29 would tend to rotate, with the result that the upper run of the belt is held taut against movement and so prevents backward rotation of the pulley 29 and corresponding backward movement of the tractor.

The shield 52 and the hood 53 which conjointly form the housing for the power unit 23 are quick detachably secured together. After the hood 53 is detached from the shield 52 it can be swung about the axis of its pivotal connection with the bar 50 from the full line to the broken line position shown in Figure 1, in which position the power unit 23 is fully exposed to view for such servicing thereof as may be required.

It will be understood, of course, that the present invention is susceptible of various changes and modifications which may be made from time to time without involving any departure from the general principles or real spirit thereof. Accordingly, it is intended to claim the same broadly, as well as specifically, as indicated in the appended claims.

What is claimed as new and useful is:

1. In a tractor, a wheel supported frame structure, a power unit on said frame structure, and power transmitting means operatively interposed between said power unit and wheels comprising an endless belt, revoluble driving and driven members associated respectively with said power unit and wheels and having said belt trained thereover, said belt being of a length and rigidity sufficient for loosely embracing said driving member while closely embracing said driven member, a belt tightener operable for taking up the slack in said belt to thereby establish a driving connection between said power unit and belt for movement of said tractor by said power unit when the latter is operating, a U-shaped guide fixed in position with a pair of arms disposed respectively on diametrically opposite sides of said driving member, said arms being convexly curved towards each other and extending toward said driven member, and an arm connecting portion disposed in spaced close embracing relation to said driving member, said arms being disposed in frictional contact with the outer surface of said belt when said belt is loosely trained about said driving member to thereby hold minor portions of said belt respectively approaching and leaving said driving member fully engaged with the same and to thereby hold the major portion of said belt intervening said U-shaped guide and driving member loosely trained over said driving member for rotation of the latter freely with respect to said belt when said power unit is operating, said arms also insuring automatic interlocking of said driving and driven members through said belt to secure said driven member and wheels against movement when said power unit is idle and said driving member is not rotating.

2. In a tractor, a wheel supported frame structure, a power unit on said frame structure, and power transmitting means operatively interposed between said power unit and wheels comprising an endless belt, revoluble driving and driven members associated respectively with said power unit and wheels and having said belt trained thereover, said belt being of a length and rigidity sufficient for loosely embracing said driving member while closely embracing said driven member, a belt tightener operable for taking up the slack in said belt to thereby establish a driving connection between said power unit and belt for movement of said tractor by said power unit when the latter is operating, guide means fixed in position with a pair of relatively fixed arms disposed respectively on diametrically opposite sides of said driving member, said arms being convexly curved toward each other and in frictional contact with the outer surface of said belt when said belt is loosely trained about said driving member to thereby hold minor portions of said belt respectively approaching and leaving said driving member fully engaged with the same and to thereby hold the major portion of said belt extending about said driving member loosely trained over the latter for rotation of said driving member freely with respect to said belt when said power unit is operating, said arms also insuring automatic interlocking of said driving and driven members through said belt to secure said driven member and wheels against movement when said power unit is idle and said driving member is not rotating.

References Cited in the file of this patent

UNITED STATES PATENTS

| | | |
|---|---|---|
| 731,588 | Meinhard | June 23, 1903 |
| 2,034,158 | Stoffel | Mar. 17, 1936 |
| 2,192,468 | Gore | Mar. 5, 1940 |
| 2,200,175 | Kaestner | May 7, 1940 |
| 2,306,348 | Spear | Dec. 22, 1942 |
| 2,322,630 | Greig | June 22, 1943 |
| 2,458,767 | Cooper | Jan. 11, 1949 |
| 2,506,548 | Hannes | May 2, 1950 |
| 2,566,164 | Callison | Aug. 28, 1951 |
| 2,572,109 | Coates | Oct. 23, 1951 |
| 2,620,612 | DeEugenio | Dec. 9, 1952 |
| 2,709,493 | Hupp | May 31, 1955 |
| 2,718,154 | Mathson | Sept. 20, 1955 |